W. PONIATOWSKI.
DRIVING GEARING.
APPLICATION FILED JAN. 31, 1914.
1,107,108.
Patented Aug. 11, 1914.
2 SHEETS—SHEET 2.
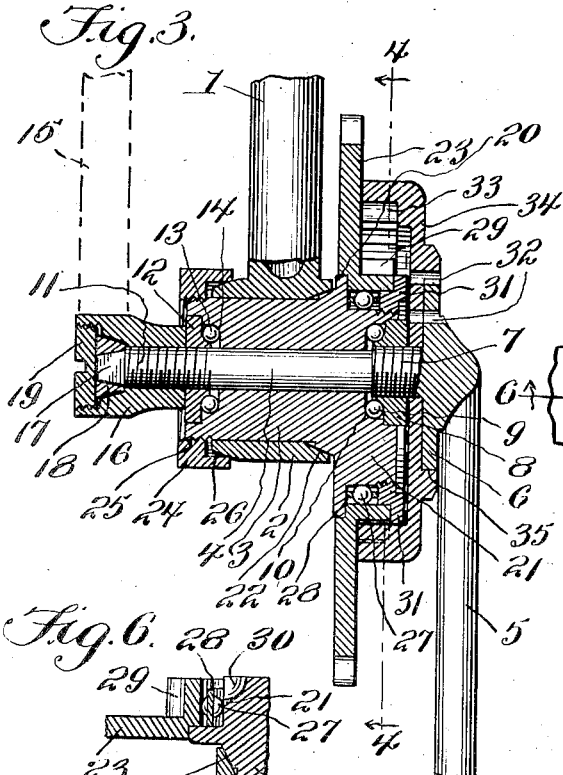
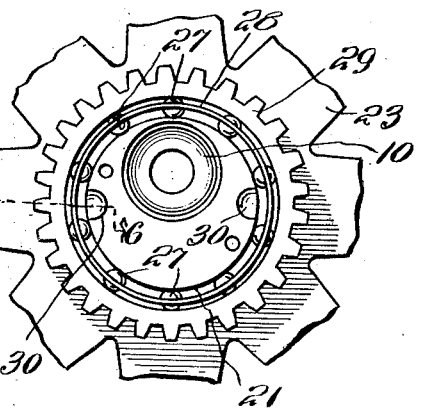
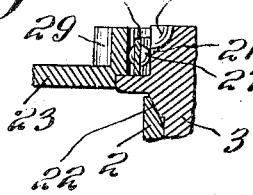
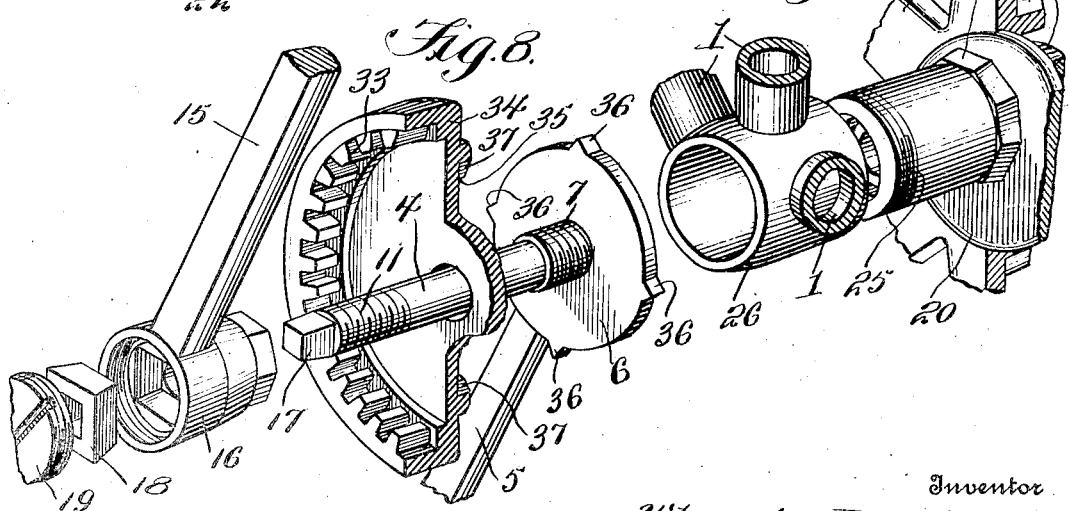
Witnesses
J. L. Wright
R. M. Smith
Inventor
Wladyslaw Poniatowski
By Victor J. Evans
Attorney

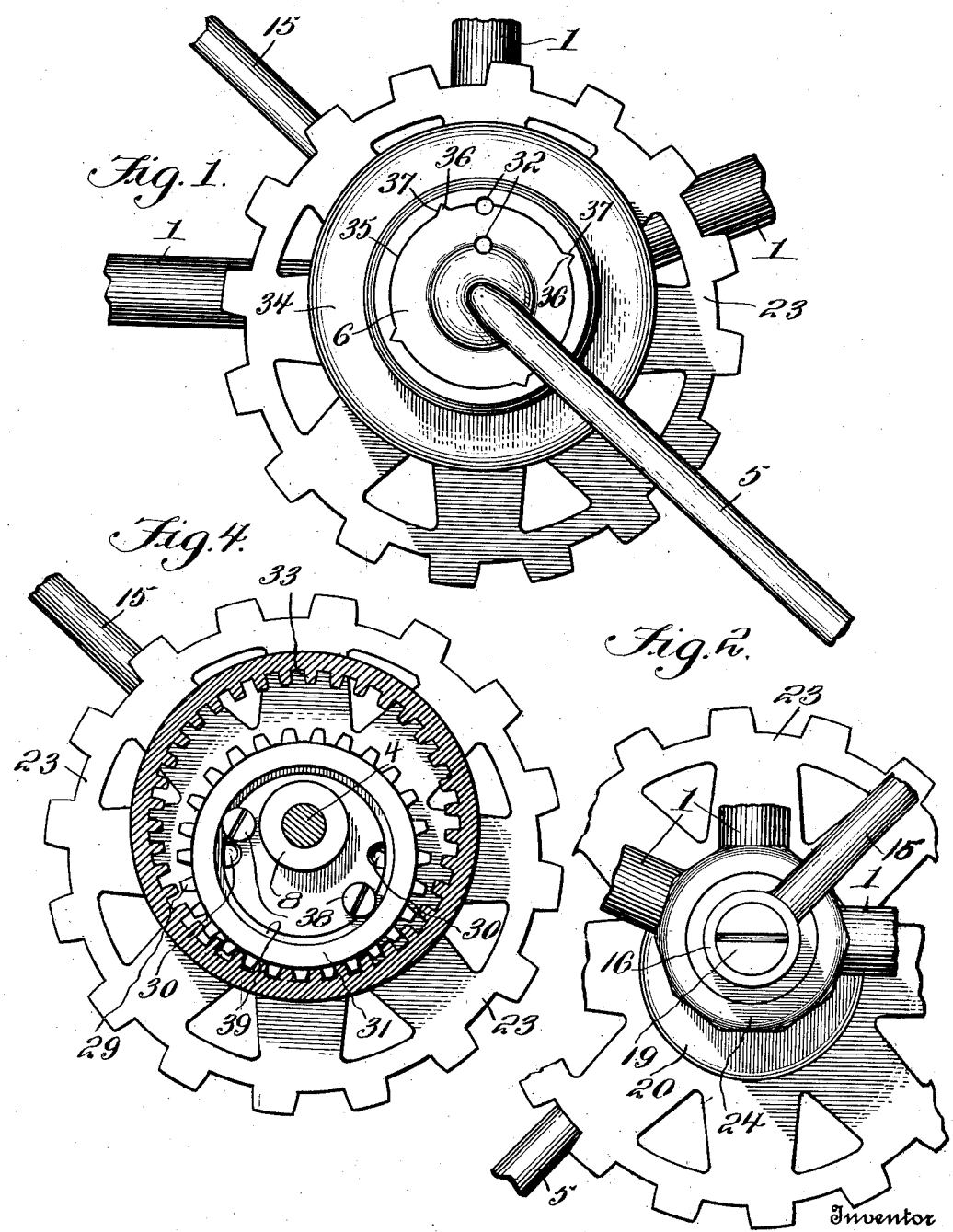

UNITED STATES PATENT OFFICE.

WLADYSLAW PONIATOWSKI, OF CAMDEN, NEW JERSEY.

DRIVING-GEARING.

1,107,108.  Specification of Letters Patent.  Patented Aug. 11, 1914.

Application filed January 31, 1914. Serial No. 815,797.

*To all whom it may concern:*

Be it known that I, WLADYSLAW PONIATOWSKI, a citizen of the United States, residing at Camden, in the county of Camden and State of New Jersey, have invented new and useful Improvements in Driving-Gearing, of which the following is a specification.

This invention relates to driving gearing for foot-propelled vehicles, being especially designed for use on bicycles and similar vehicles, the object of the invention being to produce compact and reliable mechanism whereby the driving sprocket wheel adjacent to the crank shaft is driven at a higher rate of speed than the crank shaft itself thus accelerating the rotation of the driving wheel of the machine.

A further object of the invention is to so combine the parts of the driving mechanism as to enable the same to be readily disassembled for cleaning and repair.

A further object of the invention is to provide in connection with said driving gearing, means including an eccentric bearing whereby slack may be taken up in the driving sprocket chain.

With the above and other objects in view, the invention consists in the novel construction, combination and arrangement of parts, as will hereinafter be more fully described, illustrated and claimed.

In the accompanying drawings:—Figure 1 is a side elevation of a portion of the frame of a bicycle showing the gearing of this invention applied thereto. Fig. 2 is an elevation looking toward the opposite side from Fig. 1. Fig. 3 is a diametrical section taken in line with the crank shaft, the latter being shown in elevation. Fig. 4 is a vertical longitudinal section on the line 4—4 of Fig. 3 illustrating the coöperation between the internal gear and the spur gear. Fig. 5 is a detail view showing the central portion of the driving sprocket wheel and the spur gear, the internal gear and the parts connected therewith being removed. Fig. 6 is a detail section on the line 6—6 of Fig. 5. Fig. 7 is a detail perspective view showing a portion of the driving sprocket wheel, the bearing, and the crank hanger. Fig. 8 is a detail perspective view of the crank shaft, the internal gear, the cranks and the parts intimately associated therewith.

Referring to the drawings 1 designates several of the frame bars of a bicycle or similar foot-propelled vehicle, and 2 the crank hanger toward which said frame bars converge and to which they are fixedly attached.

In carrying out the present invention, I provide a main bearing 3 which as shown in Fig. 3 is inserted through the crank hanger 2 and forms the bearing for the crank shaft 4. This crank shaft is provided at one end with a crank 5 which is preferably formed integrally with the crank shaft 4, a diskshaped flange 6 being formed on the crank 4 adjacent to the inner end of the crank 5. Adjacent to said flange 6 the crank shaft is threaded as shown at 7 to admit of the adjustment of a ball cone 8 which is threaded on the crank shaft as shown and which bears against an annular series of anti-friction balls 9 which travel in a ball-race or cup 10 formed in the adjacent face of the bearing 3. The opposite end portion of the crank shaft is also threaded at 11 to admit of the adjustment thereon of another ball cone 12 bearing against another circular series of anti-friction balls 13 contained in a ballrace or cup 14 in that end of the bearing 3. The other crank 15 at the opposite side of the machine is provided with a sleeve-like hub 16 which is threaded upon the adjacent end of the crank shaft 4 so as to bear against and lock the cone 12. The extremity of the crank shaft 4 beyond the threaded portion 11 is tapered and squared as at 17 to permit a squared and tapered key 18 to be inserted thereon for the purpose of holding the crank 15 180° from the crank 5. The key 18 is squared and tapered on the outside and fits into a recess of corresponding shape in the crank 15. A threaded plug 19 is inserted in the outer end of the hub 16 and serves to hold the key 18 in position.

The main bearing 3 is provided adjacent to one end with an eccentric flange 20 and an eccentric bearing portion 21 the purpose of which will hereinafter appear. At the inner side of the flange 20 the bearing 3 is formed with a tapered portion 22 embodying a polygonal face or a plurality of relatively flat surfaces as illustrated in Fig. 7 and the crank hanger 2 is formed with corresponding faces to engage the flat surfaces referred to for the purpose of preventing the bearing 3 from turning in the crank hanger 2. At the same time by loosening the crank shaft to remove the crank 15 and sliding the bearing 3 in the direction of its major axis, said bearing 3 can be turned on its own axis to any desired extent for the purpose of varying the angular relation of the eccentric bearing portion 21 above referred to, the object being to take up slack in the driving sprocket chain (not shown) which extends from the driving sprocket wheel 23 to the usual sprocket wheel on the rear driving wheel of the machine. When the desired adjustment has been effected, the bearing 3 is securely clamped in fixed relation to the crank hanger 2 by means of a take-up clamping collar 24 which is threaded on the bearing 3 at 25 and which is adapted to ride upon a tapered face 26 at the adjacent end of the crank hanger 2 as clearly illustrated in Fig. 3.

The sprocket wheel 23 is supported on the eccentric portion 21 of the bearing 3 by means of a radial thrust ball bearing shown in Figs. 3 and 5 as consisting of a circular series of anti-friction balls 27 contained in openings in a ring 28, the said ball thrust bearing traveling around the eccentric portion 21 of the bearing 3 and within a spur gear wheel 29 located at one side of the sprocket wheel 23 and bearing a fixed relation thereto. The bearing portion 21 is formed at one or more places with ball-insertion pockets 30 as best illustrated in Fig. 6 to allow the balls 27 to be introduced in and removed from the openings in the ring 28. These pockets 30 are quite shallow and permit the balls to be introduced into the openings in the ring while the other balls previously placed in the ring are retained in position between the bearing surfaces. Said pockets are, however, not deep enough to interfere with the bearing surfaces against which the balls roll. After the radial thrust bearing just described has been inserted in its proper place, it is held therein by a retainer ring 31 as shown in Fig. 3, said retainer ring being threaded on the eccentric portion 21 of the bearing 3. Lubricating oil may be introduced through oil holes 32 shown in Fig. 1.

33 designates an internal gear wheel which meshes with the spur gear 29 as best shown in Fig. 4. This internal gear wheel 33 is closed on its outer side as shown at 34 in Fig. 1 with the exception of the central opening for the crank shaft 4 as shown in Fig. 3 and the outer face of said internal gear is rabbeted or formed with a disk-shaped recess at 35 to receive the flange 6 on the crank shaft 4 above described. As shown in Fig. 1, the flange 6 is provided with one or more spurs 36 adapted to enter a corresponding number of notches 37 in the internal gear 33, the notches 37 forming shoulders which interlock with the spurs 36 to prevent relative rotative movement between the crank shaft and the internal gear 33. The said internal gear is thus caused to revolve with the crank shaft and acting on the spur gear wheel 29 causes the driving sprocket wheel 23 to revolve faster than the crank shaft thus accelerating the speed of the driving wheel of the machine.

The retainer ring 31 after being screwed upon the eccentric portion 21 of the bearing 3 is held in place by one or more retaining screws 38, the heads of which overlie a shoulder 39 formed by rabbeting the inner face of said retaining ring as shown in Fig. 4.

What I claim is:—

1. Driving gearing for foot-propelled vehicles, comprising in combination, a machine frame, a crank hanger, a crank shaft, a crank shaft bearing extending through said crank hanger and having an eccentric bearing portion, a crank fast on one end of said crank shaft, a flange on said crank shaft, a driving sprocket wheel journaled on the eccentric portion of said bearing, a spur gear concentric with and bearing a fixed relation to said sprocket wheel, an internal gear mounted on and concentric with said crank shaft and meshing with said spur gear, and interlocking means on said internal gear and flange on the crank shaft.

2. Driving gearing for foot-propelled vehicles, comprising in combination, a machine frame, a crank hanger, a crank shaft, a crank shaft bearing extending through said crank hanger and having an eccentric bearing portion, a crank fast on one end of said crank shaft, a flange on said crank shaft, a driving sprocket wheel journaled on the eccentric portion of said bearing, a spur gear concentric with and bearing a fixed relation to said sprocket wheel, an internal gear mounted on and concentric with said crank shaft and meshing with said spur gear, interlocking means on said internal gear and flange on the crank shaft, said bearing being adjustable around its axis, and means for preventing said bearing from turning after it has been so adjusted.

3. Driving gearing for foot-propelled vehicles, comprising in combination, a machine frame, a crank hanger, a crank shaft, a crank shaft bearing extending through said crank hanger, a crank fast on one end of said crank shaft, a flange on said crank shaft, a driving sprocket wheel journaled eccentrically on said bearing, a spur gear concentric with and bearing a fixed relation to said sprocket wheel, an internal gear mounted on and concentric with said crank shaft and meshing with said spur gear, a spur on said flange, and a shoulder on said internal gear with which said spur engages.

In testimony whereof I affix my signature in presence of two witnesses.

WLADYSLAW PONIATOWSKI.

Witnesses:
    HYMAN HOFFMAN,
    G. J. RATCLIFFE.